US012732464B2

(12) United States Patent
Iyer et al.

(10) Patent No.: US 12,732,464 B2
(45) Date of Patent: Sep. 8, 2026

(54) METHODS AND SYSTEMS FOR PREDICTION BASED TRAFFIC ENGINEERING AT A NETWORK DEVICE

(71) Applicant: Versa Networks, Inc., Santa Clara, CA (US)

(72) Inventors: Sridhar Vishwanathan Iyer, Fremont, CA (US); Sudhir Kuntal, Bengaluru (IN); Akshay Adhikari, San Jose, CA (US)

(73) Assignee: Versa Networks, Inc., Santa Clara, CA (US)

( * ) Notice: Subject to any disclaimer, the term of this patent is extended or adjusted under 35 U.S.C. 154(b) by 176 days.

(21) Appl. No.: 18/646,426

(22) Filed: Apr. 25, 2024

(65) Prior Publication Data

US 2025/0219946 A1 Jul. 3, 2025

Related U.S. Application Data

(60) Provisional application No. 63/615,718, filed on Dec. 28, 2023.

(51) Int. Cl.
*H04L 47/125* (2022.01)
*H04L 47/2425* (2022.01)

(52) U.S. Cl.
CPC ........ *H04L 47/125* (2013.01); *H04L 47/2425* (2013.01)

(58) Field of Classification Search
CPC . H04L 47/125; H04L 47/2425; H04L 45/121; H04L 45/64; H04L 41/0894; H04L 45/70; H04L 47/20; H04L 47/127
See application file for complete search history.

(56) References Cited

U.S. PATENT DOCUMENTS

2003/0063610 A1* 4/2003 Yik .......................... H04L 45/02 370/392
2007/0195702 A1* 8/2007 Yuen ........................ H04L 45/26 370/238
2008/0182663 A1* 7/2008 Cheung ................. A63F 13/332 463/41
2016/0234121 A1* 8/2016 Zou .......................... H04L 41/12
2019/0036780 A1* 1/2019 Evans ................... H04L 41/342
2019/0036816 A1* 1/2019 Evans ................. H04L 41/5009
2020/0213199 A1* 7/2020 Sethi ................... H04L 41/0823
2021/0218642 A1* 7/2021 Pasupathy ........... H04L 41/5019
2021/0297928 A1* 9/2021 Chowta ................. H04W 40/32
2023/0189050 A1* 6/2023 Rao ................... H04W 28/0236 370/231

OTHER PUBLICATIONS

Asif, Rameez et al. "AI Secured SD-WAN Architecture as a Latency Critical IoT Enabler for 5G and Beyond Communications", IEEE, 2021, 6 pgs.

(Continued)

*Primary Examiner* — Johnny B Aguiar
(74) *Attorney, Agent, or Firm* — LOZA & LOZA, LLP

(57) ABSTRACT

Methods and system for operating a network device are disclosed. In an embodiment, a method for operating a network device involves generating a traffic engineering decision in response to applying a traffic engineering rule to a predicted performance metric, and implementing a traffic engineering action at the network device in response to the traffic engineering decision.

21 Claims, 9 Drawing Sheets

(56) References Cited

OTHER PUBLICATIONS

Koufos, Konstantinos et al. "Trends in Intelligent Communication Systems: Review of Standards, Major Research Projects, and Identification of Research Gaps", J. Sens. Actuator Netw. 2021, 10, 60 (2021), 34 pgs.
Kytomaki, Joni, "Artificial Intelligence and Machine Learning With Sd-Wan", Master of Science Thesis Faculty of Information Technology and Communication Sciences, Jan. 2021, 75 pgs.
Latah, Majd et al. "Artificial Intelligence Enabled Software Defined Networking: A Comprehensive Overview", Nov. 6, 2018, 26 pgs.
Quang, Pham Tran Anh et al. "Global QoS Policy Optimization in SD-WAN", Apr. 11, 2023, 8 pgs.
Troia, Sebastian et al. "On Deep Reinforcement Learning for Traffic Engineering in SD-WAN", IEEE, 2020, 15 pgs.

* cited by examiner

20230823T235939_2.txt:2023-08-23T23:50:39+0000 sdwanB2BSlamLog, applianceName=Acme-Spoke-2, tenantName=ACME, localAccCktId=1, localAccCktName=MPLS, remoteAccCktId=3, remoteAccCktName=MPLS, localSiteId=109, localSiteName=Acme-Spoke-2, remoteSiteId=1, remoteSiteName=Acme-Spoke-1, fwdClass=fc_nc, applianceId=0, tenantId=8, delay=1, fwdDelayVar=9, revDelayVar=9, fwdLoss=0, revLoss=0, fwdLossRatio=0, revLossRatio=0, pduLossRatio=0

20230823T235939_2.txt:2023-08-23T23:50:39+0000 sdwanB2B SlamLog, applianceName=Acme-Spoke-2, tenantName=ACME, localAccCktId=2, localAccCktName=BB1, remoteAccCktId=1, remoteAccCktName=BB1, localSiteId=109, localSiteName=Acme-Spoke-2, remoteSiteId=2, remoteSiteName=Acme-Spoke-1, fwdClass=fc_nc, applianceId=0, tenantId=8, delay=3, fwdDelayVar=8, revDelayVar=8, fwdLoss=0, revLoss=0, fwdLossRatio=0, revLossRatio=0, pduLossRatio=0

20230823T235832_4.txt:2023-08-23T23:52:32+0000 tcpAppMonLog, applianceName=Acme-Spoke-2, tenantName=ACME, mstatsTimeBlock=1692834600, tenantId=2, applianceId=0, vsnId=0, tcpSessCnt=3, tcpSessDur=3151, tcp PktsFwd=5, tcpPktsRev=121, tcpReXmitFwd=0, tcpReXmitRev=0, tcpSSA=15131, tcpSAA=1865, tcpTWHS=16996, tcpSynReXmit=0, tcpSynAckReXmit=0, tcpConnRefused=0, tcpConnAborted=0, appId=office365, networkPrefix=172.230.150.0/24, user=172.20.101.50, siteName=Acme-Spoke-2, accCktName=BB2, siteId=106, accCktId=2

20230823T235832_4.txt:2023-08-23T23:52:32+0000 tcpAppMonLog, applianceName=Acme-Spoke-2, tenantName=ACME, mstatsTimeBlock=1692834600, tenantId=2, applianceId=0, vsnId=0, tcpSessCnt=1, tcpSessDur=973, tcpPktsFwd=3, tcpPktsRev=119, tcpRecXmitFwd=0, tcpReXmitRev=0, tcpSSA=3415, tcpSAA=552, tcpTWHS=3397, tcpSynReXmit=0, tcpSynAckReXmit=0, tcpConnRefused=0, tcpConnAborted=0, appId=office365, networkPrefix=172.230.150.0/24, user=172.20.101.50, siteName=Acme-Spoke-2, accCktName=BB1, siteId=106, accCktId=1

Entity-Specific Performance Info

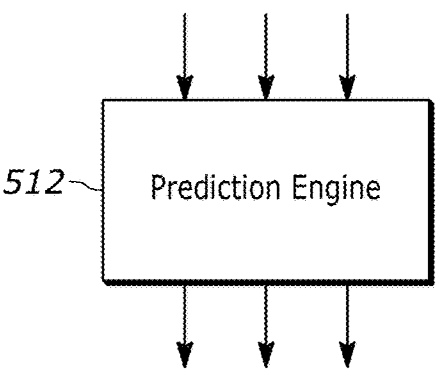

Entity-Specific Predicted Performance Metrics

Target Device ID, Two-Way Delay In Ten Minute Increments For The Upcoming Seven Days, Forward Delay Variation In ten Minutes Increments For The Upcoming Seven Days, Reverse Delay Variation In Ten Minute Increments For The Upcoming Seven Days, Reverse Delay Variation In Ten Minute increments For The Upcoming Seven Days, Forward Loss Ratio In Ten Minute Increments For The Upcoming Seven Days, Reverse Loss Ratio In Ten Minute Increments For The Upcoming Seven Days, PDU Loss Ratio In Ten Minute Increments For The Upcoming Seven Days

Target Device ID, Session Establishment Time In Ten Minute Increments For The Upcoming Seven Days, Sessions Made in ten Minute Increments For The Upcoming Seven Days, Packets Sent Per Application in Ten Minute Increments For The Upcoming Seven Days, Packet Retransmits in Ten Minute Increments For The Upcoming Seven Days, Connections Refused In Ten Minute Increments For The Upcoming Seven Days

FIG. 6B

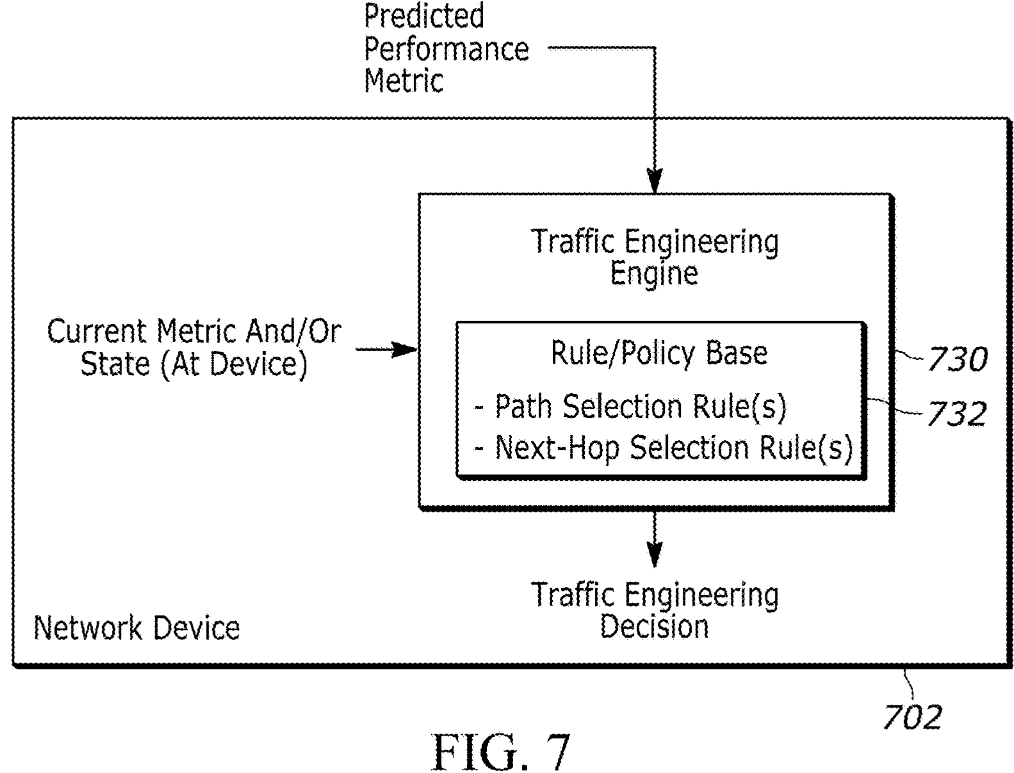

| Predicted Performance Metric | Traffic Engineering Rule |
| --- | --- |
| Predicted Path Performance Metric<br>- Two-Way Delay<br>- Forward Delay Variation<br>- Reverse Delay Variation<br>- Forward Loss Ratio<br>- Reverse Loss Ratio<br>- PDU Loss Ratio | Path Selection Rule(s)<br>Interface Selection (s) |
| Predicted Application Performance Metric<br>- Type<br>- Latency<br>- Loss | Next-Hop Selection Rule(s) |

FIG. 8

METHODS AND SYSTEMS FOR PREDICTION BASED TRAFFIC ENGINEERING AT A NETWORK DEVICE

BACKGROUND

A Software-Defined Wide Area Network (SD-WAN) is a networking technology that utilizes software-defined principles to intelligently manage and optimize traffic flow across a WAN, such as the Internet. Traffic engineering within an SD-WAN may involve the strategic manipulation and steering of data traffic to enhance network performance and efficiency. Such traffic steering may involve the intelligent selection and prioritization of traffic paths to optimize the flow of data and can be driven by various factors, including application requirements, network performance metrics, security policies, and user-defined preferences. By analyzing such factors in real time, an SD-WAN network can dynamically steer traffic along the most efficient paths, ensuring that critical applications receive a desired bandwidth and quality of service while less critical or non-essential traffic is directed through alternative routes. Although traffic engineering within an SD-WAN has made strides in improving network performance and user experience, the complexity of such networks and the growth in data volume may still result in bottlenecks and less than desirable user experiences.

SUMMARY

Methods and system for operating a network device are disclosed. In an embodiment, a method for operating a network device involves generating a traffic engineering decision in response to applying a traffic engineering rule to a predicted performance metric, and implementing a traffic engineering action at the network device in response to the traffic engineering decision.

In an example, The method of claim 1, wherein the predicted performance metric is received on a network interface of the network device and wherein the predicted performance metric is specific to the network device.

In an example, the network device is a network device in an SD-WAN.

In an example, the predicted performance metric is received on the network interface of the network device from a controller of an SD-WAN.

In an example, the predicted performance metric is received on the network interface of the network device from a management system of an overlay network.

In an example, the traffic engineering decision involves selecting a path on which to transmit Protocol Data Units (PDUs), and the traffic engineering action involves transmitting PDUs on the selected path/link.

In an example, the traffic engineering decision involves selecting a physical interface of the network device on which to transmit PDUs, and the traffic engineering action involves transmitting PDUs on the selected physical interface.

In an example, the predicted performance metric is a predicted path performance metric.

In an example, the predicted path performance metric is two-way delay.

In an example, the predicted path performance metric is forward delay variation.

In an example, the predicted path performance metric is reverse delay variation.

In an example, the predicted path performance metric is forward loss ratio.

In an example, the predicted path performance metric is reverse loss ratio.

In an example, the predicted path performance metric is PDU loss ratio.

In an example, the predicted path performance metric corresponds to a Service Level Agreement (SLA).

In an example, the traffic engineering decision involves selecting a next hop on which to transmit PDUs, and the traffic engineering action involves directing PDUs to the next hop.

In an example, the predicted performance metric is a predicted application performance metric.

In an example, the predicted application performance metric is a prediction about the type of application that will be used.

In an example, the predicted application performance metric is a prediction of application latency.

In an example, the predicted application performance metric is a prediction of application loss.

In an example, the traffic engineering decision involves selecting a physical interface on which to transmit data, and the traffic engineering action involves transmitting data on the selected physical interface.

In another example, a non-transitory computer readable medium that stores computer readable instructions, which when executed on one or more processors, implements a method for operating a network device, is disclosed. The method that is implemented involves generating a traffic engineering decision in response to applying a traffic engineering rule to a predicted performance metric, and implementing a traffic engineering action at the network device in response to the traffic engineering decision.

In another example, another method for operating an overlay network is disclosed. The method involves collecting performance data from network devices in an overlay network, generating device-specific predicted performance metrics from the performance data that is collected from the network devices in the overlay network, distributing the device-specific predicted performance metrics to the corresponding network devices in the overlay network, generating device-specific traffic engineering decisions at the network devices in response to applying a traffic engineering rule to a device-specific predicted performance metric, and implementing traffic engineering actions at the network devices in response to the device-specific traffic engineering decisions.

In an example, the device-specific predicted performance metrics are generated at a controller of the overlay network and the device-specific traffic engineering decisions are made at network devices of the overlay network in response to device-specific predicted performance metrics that are received from the controller of the overlay network.

Other aspects and advantages of embodiments of the present invention will become apparent from the following detailed description taken in conjunction with the accompanying drawings.

BRIEF DESCRIPTION OF THE DRAWINGS

FIGS. 3A and 3B depict example of performance information logs related to path performance, which may be generated by the devices in the SD-WAN and provided to the data collectors of the controllers.

FIGS. 4A and 4B depict examples of performance information logs related to application performance, which may be generated by the branch office devices in the SD-WAN and provided to the data collectors of the controllers.

FIG. 5 illustrates an example operation of the prediction engine described with reference to FIG. 2.

FIG. 6A depicts an example of predicted path performance metrics.

FIG. 6B depicts an example of predicted application performance metrics.

FIG. 7 illustrates an example operation of a traffic engineering engine that is implemented at a network device in an SD-WAN, such as the SD-WAN described with reference to FIG. 1.

FIG. 8 is an example matrix of predicted performance metrics and corresponding traffic engineering rules.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
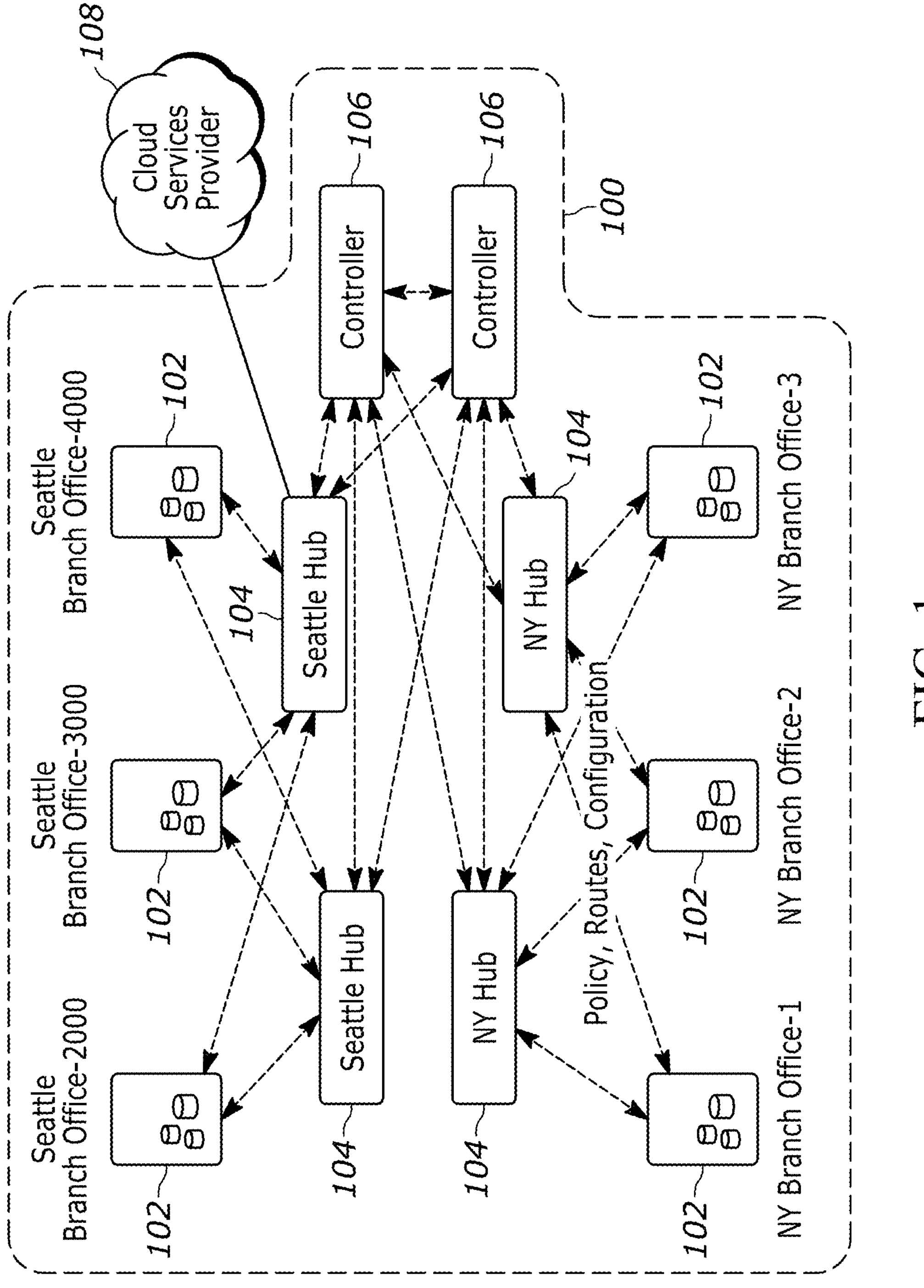
FIG. 1 is an example of an SD-WAN that includes branch offices, hubs, and controllers that are connected to each other via a network, including a WAN, such as the Internet.

An SD-WAN can provide network connectivity that efficiently manages traffic across distributed network devices. An SD-WAN architecture typically includes a network of intelligent devices, including branch office devices, hub devices, and controllers, working in tandem to optimize network performance, security, and reliability. FIG. 1 is an example of an SD-WAN 100 that includes branch offices 102, hubs 104, and controllers 106 that are connected to each other via a network, including a WAN, such as the Internet (not shown). In the example of FIG. 1, the branch offices include Seattle branch office-2000, Seattle branch office-3000, Seattle branch office-4000, New York (NY) branch office-1, NY branch office-2, and NY branch office-3, and the hubs include two Seattle hubs and two NY hubs. The branch offices include branch office devices, the hubs include hub devices, and the controllers include controller devices, which are some combination of hardware and software. In an example, the SD-WAN is supported by special purpose software that runs on desired devices (e.g., branch office devices, hub devices, and controller devices) to implement an overlay network such as an SD-WAN. As illustrated in FIG. 1, the SD-WAN may also provide access to networks outside of the SD-WAN, such as a cloud services provider 108. For example, cloud based services, such as application services providers may be accessed from the SD-WAN to provide cloud bases services and/or applications such as video streaming services, communications services, office productivity services, storage services, and/or enterprise services.

In the example of FIG. 1, the branch office devices of the branch offices 102 constitute the endpoints of the SD-WAN 100 and are typically installed at various geographically distributed locations. In an example, the branch office devices include network devices such as routers, switches, or purpose-built appliances with SD-WAN software installed thereon. The branch office devices handle traffic routing, application prioritization, and secure connectivity to an SD-WAN fabric (which typically includes the hubs). Branch office devices are designed to adapt to varying network conditions, ensuring seamless and efficient data transmission across an intervening WAN, such as the Internet. Although the endpoints in the SD-WAN are described as branch offices and branch office devices, the endpoints in the SD-WAN can be any network device that is an endpoint in the SD-WAN including fixed location network devices and mobile network devices. In an example, the endpoints are often times smaller computing devices that have a single central processor unit (CPU) and fit on a desktop or in a single rack of a server rack.

The hub devices of the hubs 104 serve as centralized aggregation points within the SD-WAN 100. In an example, the hub devices are located in data centers or cloud environments and are configured to efficiently manage and direct traffic between branch offices and the controllers and to external networks such as external cloud service providers. Hub devices may utilize advanced traffic analysis algorithms to optimize data flow, ensuring efficient and secure paths for the traffic associated with different applications that are being used. The hub devices may also facilitate secure communication by employing encryption protocols and enforcing access policies. In an example, the hubs are implemented on computing devices in a data center or some other shared computing resources that aggregate large volumes of data transmissions.

The controllers 106 are the orchestrators of the SD-WAN 100, overseeing and coordinating the entire SD-WAN. In an example, the controllers operate as centralized management interfaces, enabling administrators to configure policies, allocate resources, and monitor network performance in real time. The controllers may leverage intelligent algorithms and machine learning techniques to direct the dynamic adjustment of traffic routing based on network conditions, application requirements, and security protocols. In an example, the controllers also ensure consistent policy enforcement across the SD-WAN, thereby providing a unified and adaptive network experience. In some embodiments, the functions of a controller are implemented on a single physical computing device, and in other embodiments, functions of the controller are implemented by multiple different computing devices. In an example, the controllers are implemented on computing resources at public data centers, with large-scale (e.g., "hyperscale") computing capacity.

In the example shown in FIG. 1, there are multiple hubs 104 and controllers 106, which can provide alternative paths through the SD-WAN 100 and redundancy in case of equipment failures. The dashed line arrows in FIG. 1 illustrate the communication of information between the branch offices, the hubs, and the controllers in the SD-WAN. For example, the information that is communicated may include policy information, route information, and/or configuration information, which is specific to the SD-WAN.

In an SD-WAN, such as the SD-WAN 100 described with reference to FIG. 1, traffic can be "engineered" or "steered" to travel on various different paths depending on conditions in the SD-WAN network. For example, through traffic steering mechanisms, an SD-WAN can adapt to changing network conditions, such as latency, packet loss, or bandwidth availability. For instance, if a certain path in the SD-WAN experiences congestion or degradation in performance, the SD-WAN can automatically reroute traffic through an alternate path in the SD-WAN that has better performance characteristics, ensuring seamless and uninterrupted connectivity for applications. In one particular example, a network device in the SD-WAN may choose a particular path through the SD-WAN based on the current conditions on multiple available paths. Although network devices are often adept at making traffic engineering decisions based on current conditions in the SD-WAN, conditions in such SD-WANs can be very dynamic, which can reduce the effectiveness of some traffic engineering decisions.

It has been realized that predictions of future performance metrics based on analysis of past performance information can be used by network devices in an SD-WAN to make traffic engineering decisions. For example, a network device in an SD-WAN can apply a traffic engineering rule to a predicted performance metric that was received from a controller to generate a traffic engineering decision and then the network device can take a traffic engineering action in response to the traffic engineering decision. In a particular example, a network device in an SD-WAN may select a particular path through the SD-WAN or a particular interface (e.g., a wired interface or a wireless interface) on which to transmit data in response to a predicted performance metric that is received from a controller.

Predicted performance metrics that may be particularly relevant in an SD-WAN may include predicted path performance metrics such as two-way delay, forward delay variation, reverse delay variation, forward loss ratio, reverse loss ratio, and/or PDU loss ratio, and/or predicted application performance metrics such as the type of application being used, the latency associated with the application, and/or the loss associated with the application. In an example, the predicted performance metrics are specific to particular entities. The entity may be a network device such as a branch office device, a hub device, and/or a particular tenant in the SD-WAN. For example, a predicted performance metric may be a predicted two-way delay on a path that is specific to a particular branch office device in the SD-WAN. By making traffic engineering decisions at network devices in an SD-WAN using predicted performance metrics, the traffic engineering decisions made at those devices may better account for future conditions on the SD-WAN, thereby providing a better user experience.

In an example, performance metric predictions, which are used by the network devices in the SD-WAN to make traffic engineering decisions, are made at a central location by a prediction engine of the SD-WAN and then distributed to the network devices such as branch office devices and/or hub devices that are connected within the SD-WAN. In an example, the prediction engine is implemented at a controller of the SD-WAN and the prediction engine is supplied with a rich set of future performance data from throughout the SD-WAN. The prediction engine can then apply machine learning and/or artificial intelligence techniques to the rich set of performance data to generate predictions of performance metrics that can be pushed out to network devices in the SD-WAN (e.g., branch office devices) and used by corresponding network devices to make insightful traffic engineering decisions that take into consideration predictions of future performance of the SD-WAN. Because the performance metric predictions are made at a centralized component of the SD-WAN like the controller, more powerful computing resources can be used to generate the predicted performance metrics. That is, while the branch office devices may be computing devices with a single CPU, such as a desktop computing device, that has limited computing resources, the controllers may run on computer servers that are maintained in large data centers, such as large-scale cloud services providers. Additionally, because the predicted performance metrics are pushed out to the network devices in the SD-WAN for local decision making, the network devices in the SD-WAN such as the branch office devices and the hub devices, can use predicted performance metrics to make quick device-specific traffic engineering decisions without having to receive such decisions from the controller, which may be supporting hundreds, or even thousands of different network devices.

Figure 2:
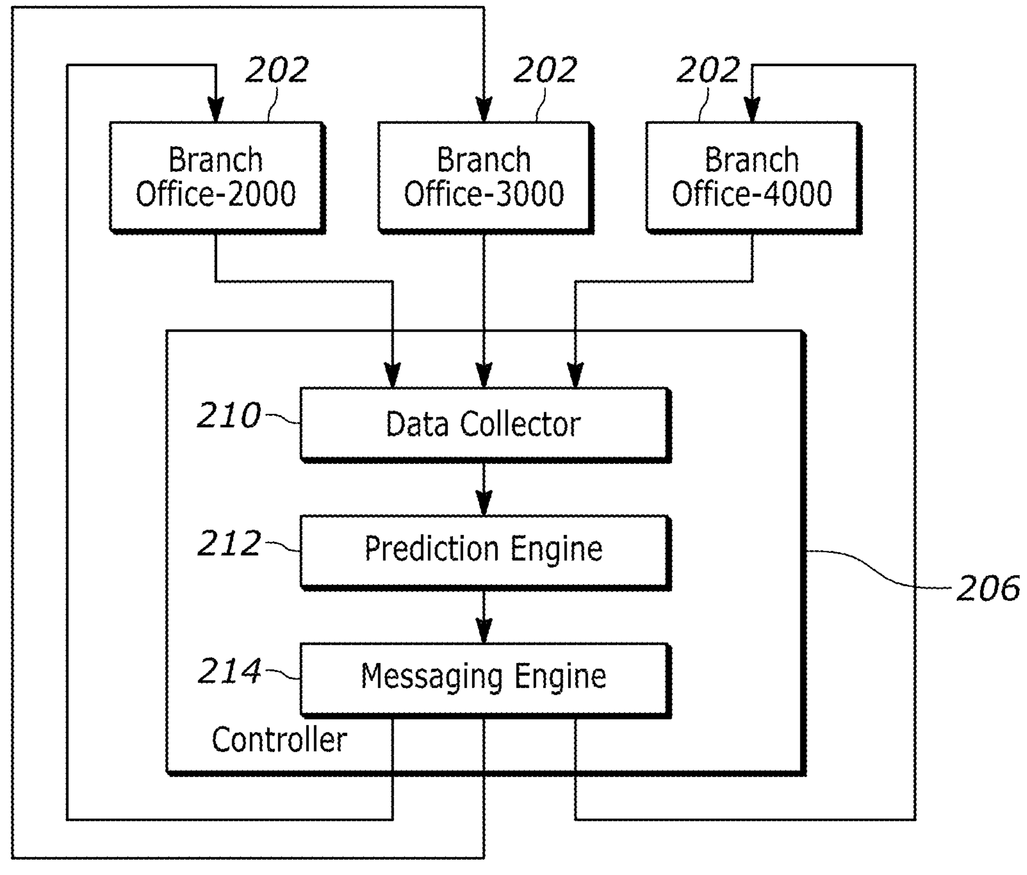
FIG. 2 illustrates an example of a process for generating and distributing predicted performance metrics that may be implemented in a controller of the SD-WAN as described with reference to FIG. 1.

FIG. 2 illustrates an example of a process for generating and distributing predicted performance metrics that may be implemented in a controller 206 of the SD-WAN as described with reference to FIG. 1. In a first operation, branch office devices 202, e.g., branch office-2000, branch office-3000, and branch office-4000, provide device-specific performance information to a data collector 210 of the controller. Examples of performance information are described below with reference to FIGS. 3A, 3B, 4A, and 4B. The data collector processes the received performance information and provides the processed performance information to a prediction engine 212. In an example, the data collector may aggregate performance information over time intervals to provide aggregated performance information to the prediction engine. The prediction engine processes the performance information and generates predicted performance metrics. For example, the prediction engine uses machine learning techniques to generate entity/device-specific predicted performance metrics, such as a device-specific predicted performance metric that is specific to branch office-2000, a device-specific predicted performance metric that is specific to branch office-3000, and a device-specific predicted performance metric that is specific to branch office-4000. Examples of device-specific predicted performance information include two-way delay, forward delay variation, reverse delay variation, forward loss ratio, reverse loss ratio, and/or PDU loss ratio. The device-specific predicted performance metrics are provided to a messaging engine 214 for distribution to the branch offices in the SD-WAN. As illustrated in FIG. 2, the messaging engine provides the device-specific predicted performance metrics to each of the branch offices, e.g., Seattle branch office-2000, Seattle branch office-3000, and Seattle branch office-4000. For example, the messaging engine generates entity-specific messages that include at least one entity-specific predicted performance metric.

Figures 3A, 3B:
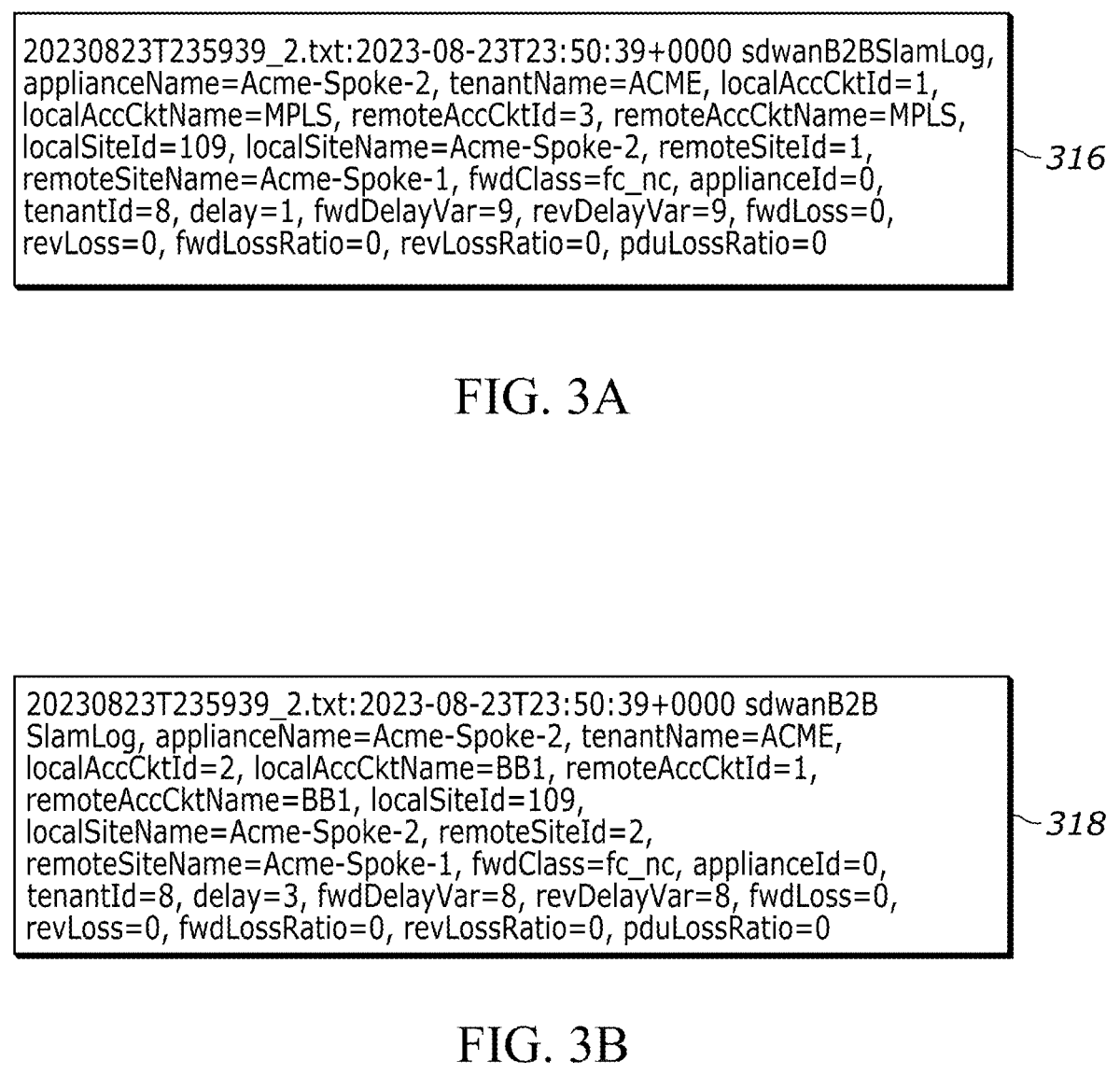

FIGS. 3A and 3B depict examples of performance information related to path performance, referred to herein as path performance information, which may be generated by the devices in the SD-WAN and provided to the data collectors of the controllers. In particular, FIGS. 3A and 3B depicts example service level agreement (SLA) monitoring logs 316 and 318 that are generated at branch office devices and sent to a data collector of a controller. In an example, the SLA monitoring logs convey information about communications between two devices in the SD-WAN, for example, the SLA logs convey information about communications between two branch office devices in an SD-WAN. With respect to communications between two devices in an SD-WAN, the performance information may include packet latency, packet jitter in both directions, packet loss in both directions, packet loss percentages in both directions, and/or percentage loss of protocol packets. With reference to FIGS. 3A and 3B, performance information included in SLA monitoring logs may include:

Log Identifier (ID): 20230823T235939_2.txt:
Timestamp: 2023-08-23T23:50:39+0000
Log name: sdwanB2BSlamLog
Appliance name: applianceName=Acme-Spoke-2
Tenant name: tenantName=ACME
Local access circuit ID: localAccCktId=1
Local access circuit name: localAccCktName=MPLS
Remote access circuit ID: remoteAccCktId=3
Remote access circuit name: remoteAccCktName=MPLS
Local site ID: localSiteId=109
Local site name: localSiteName=Acme-Spoke-2
Remote site ID: remoteSiteId=1
Remote site name: remoteSiteName=Acme-Spoke-1
Forwarding class: fwdClass=fc_nc
Appliance ID: applianceId=0
Tenant ID: tenantId=8
Delay: delay=1
Forward direction delay variation: fwdDelayVar=9
Reverse direction delay variation: revDelay Var=9
Forward direction loss: fwdLoss=0
Reverse direction loss: revLoss=0
Forward direction loss ratio: fwdLossRatio=0
Reverse direction loss ratio: revLossRatio=0
PDU loss ratio: pduLossRatio=0

Figures 4A, 4B:
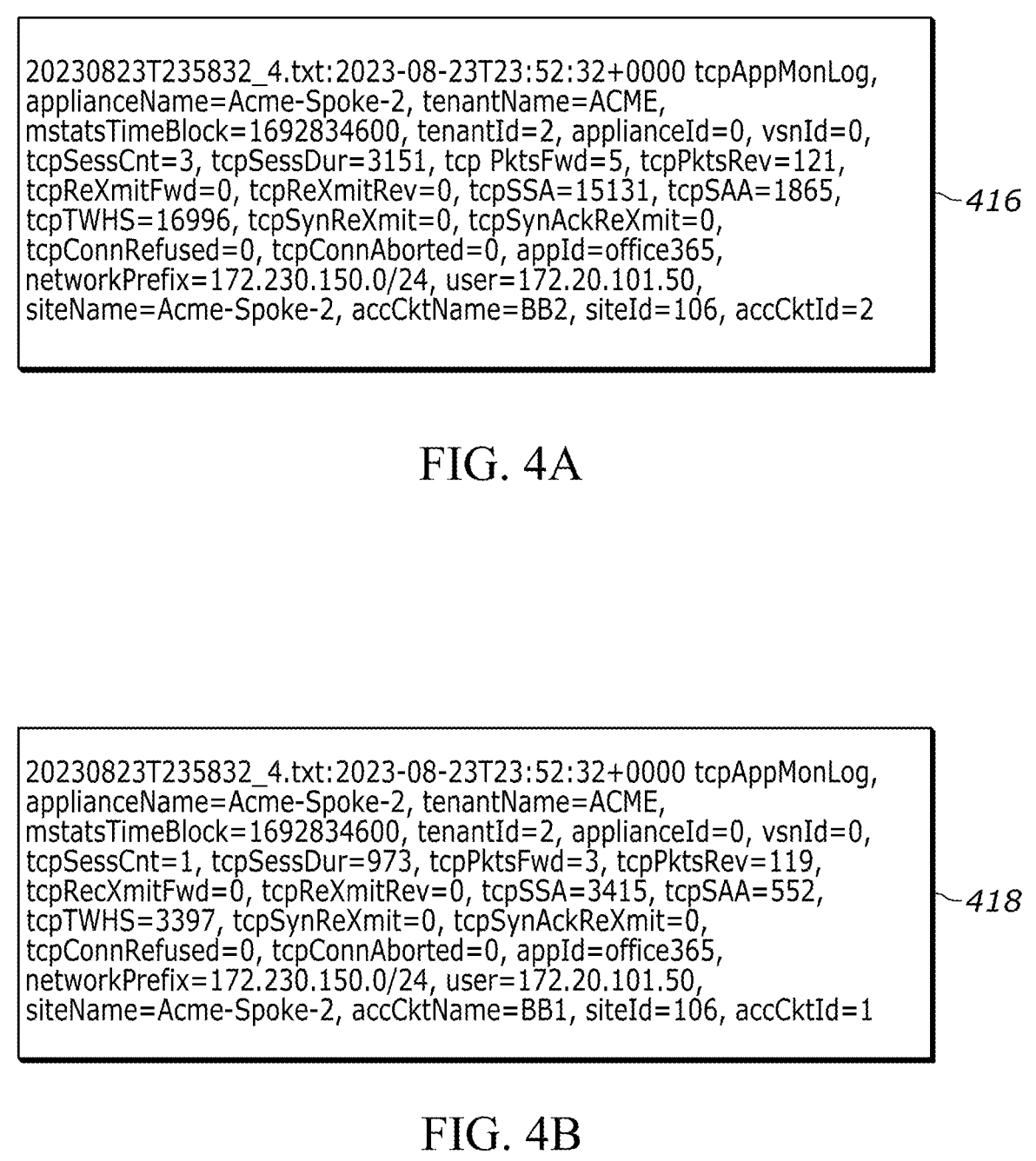

FIGS. 4A and 4B depict examples of performance information related to application performance, referred to herein as application performance information, which may be generated by the branch office devices in the SD-WAN and provided to the data collectors of the controllers. In particular, FIGS. 4A and 4B depicts example Transmission Control Protocol (TCP) application monitoring logs 416 and 418 for applications that are accessed from outside the SD-WAN by a device in the SD-WAN. For example, a branch office device may access cloud based application services such as video streaming services, communications services, office productivity services, storage services, and enterprise services, which are hosted in a cloud that is outside of the SD-WAN. With respect to communications between a device in the SD-WAN and a device, or devices, outside of the SD-WAN (e.g., cloud-based services), the performance information may include what cloud services and/or applications were accessed, session establishment time, how many sessions were made to the application, how many packets were sent to an application, how many packets were retransmitted in the forward direction due to drops, how many connections where refused or aborted. With reference to FIGS. 4A and 4B, performance information included in TCP application monitoring logs may include:

Log ID: 20230823T235832_4.txt
Timestamp: 2023-08-23T23:52:32+0000
Log name: tcpAppMonLog
Appliance name: applianceName=Acme-Spoke-2
Tenant name: tenantName=ACME
Measured statistics time block: mstatsTimeBlock=1692834600
Tenant ID: tenantId=2
Appliance ID: applianceId=0
Virtual network ID: vsnId=0
TCP session count: tcpSessCnt=3
TCP session duration: tcpSessDur=3151
TCP packets forward direction: tcpPktsFwd=5
TCP packets reverse direction: tcpPktsRev=121
TCP packets retransmitted forward direction: tcpReXmitFwd=0
TCP packets retransmitted reverse direction: tcpReXmitRev=0
TCP session establishment time: tcpSSA=15131
TCP secure authentication agent: tcpSAA=1865
TCP three way handshake: tcpTWHS=16996
TCP SYN retransmits: tcpSynReXmit=0
TCP SYN ACK retransmits: tcpSynAckReXmit=0
TCP connections refused: tcpConnRefused=0
TCP connections aborted: tcpConnAborted=0
Application ID: appId=office365
Network Internet Protocol (IP) prefix: networkPrefix=172.230.150.0/24
User IP: user=172.20.101.50
Site name: siteName=Acme-Spoke-2
Access circuit name: accCktName=BB2

Site ID: siteId=106

Access circuit ID: accCktId=2

Although examples of path performance information and application performance information are described with reference to FIGS. 3A, 3B, 4A, and 4B, respectively, other types of performance information such as bandwidth logs can be generated at devices (such as the branch office devices and hub devices) and provided to the data collector of the controller. Additionally, although the examples described with reference to FIGS. 3A, 3B, 4A, and 4B are described as being generated from branch office devices, path performance information and application performance information can be generated from other network devices in the SD-WAN, and/or from devices outside of the SD-WAN.

FIG. 5 illustrates an example operation of the prediction engine 212 described with reference to FIG. 2. As illustrated in FIG. 5, the prediction engine 512 receives entity-specific performance information and outputs entity-specific predicted performance metrics. For example, the prediction engine receives device-specific performance information from the branch offices, e.g., Seattle branch office-2000, Seattle branch office-3000, and Seattle branch office-4000, and outputs device-specific predicted performance information for the branch offices, e.g., Seattle branch office-2000, Seattle branch office-3000, and Seattle branch office-4000. In an example, the entity-specific performance information may include entity-specific performance information such as that described with reference to FIGS. 3A, 3B, 4A, and 4B, which has been processed by the data collector. For example, the data collector may aggregate performance information received in the monitoring logs into statistical information over some periods of time. In some examples, an entity may be a network device such as a network device identified by a device ID. In other examples, the entity may be an entity such as a specific customer or tenant that is supported by network devices in the SD-WAN. In some examples, a network device may support only one entity (e.g., a single customer or tenant) and in other examples a single network device may support multiple different entities, such as multiple different customers or multiple different entities.

In an example, the entity-specific predicted performance metrics may include predicted path performance metrics such as two-way delay, forward delay variation, reverse delay variation, forward loss ratio, reverse loss ratio, and/or PDU loss ratio. Additionally, the predicted performance metrics may include some future temporal aspect, e.g., time/day/month/date. For example, the predicted performance metrics may include two-way delay, forward delay variation, reverse delay variation, forward loss ratio, reverse loss ratio, and/or PDU loss ratio in ten minute increments for the upcoming seven days. FIG. 6A depicts an example of a message 620 that includes predicted path performance metrics for a particular entity, which includes:

1) two-way delay in ten minute increments for the upcoming seven days;
2) forward delay variation in ten minute increments for the upcoming seven days;
3) reverse delay variation in ten minute increments for the upcoming seven days;
4) forward loss ratio in ten minute increments for the upcoming seven days;
5) reverse loss ratio in ten minute increments for the upcoming seven days; and
6) PDU loss ratio in ten minute increments for the upcoming seven days.

In another example, the entity-specific predicted performance metrics may include predicted application performance metrics such as the type of application being used, the latency associated with the application, and/or the loss associated with the application. FIG. 6B depicts an example of a message 622 that includes predicted application performance metrics for a particular application and for a particular entity, which includes:

1) session establishment time in ten minute increments for the upcoming seven days;
2) sessions made in ten minute increments for the upcoming seven days;
3) packets sent per application in ten minute increments for the upcoming seven days;
4) packet retransmits in ten minute increments for the upcoming seven days; and
5) connections refused in ten minute increments for the upcoming seven days.

In an example, the prediction engine 212 and 512 described with reference to FIGS. 2 and 5 may use known machine learning and/or artificial intelligence techniques to generate the predicted performance metrics. Explanation of the machine learning and/or artificial intelligence techniques for generating predicted performance metrics in the context of SD-WAN traffic engineering are known in the field and not described in detail herein.

As described above, the predicted performance metrics are generated centrally and then distributed to network devices in the SD-WAN for use in generating device-specific traffic engineering decisions. FIG. 7 illustrates an example operation of a traffic engineering engine 730 that is implemented at a network device 702 in an SD-WAN such as at a branch office device 102 in the SD-WAN described with reference to FIG. 1. As shown in FIG. 7, the traffic engineering engine of the device receives a predicted performance metric (e.g., from a controller) and generates a traffic engineering decision in response to the predicted performance metric. The traffic engineering engine may also receive a current metric and/or state information that is generated at the network device for use in making a traffic engineering decision. For example, current information may include current path performance metrics, and/or current application performance metrics. In an example, the traffic engineering engine of the network device applies a traffic engineering rule from a locally stored rule/policy database 732 to the predicted performance metric to generate the traffic engineering decision at the device. For example, a traffic engineering rule that is configured for enforcement at the network device may be expressed in pseudocode as:

if predicted delay on Path A is greater than 1 ms,
 then select Path B,
 else select Path A.

Thus, applying the traffic engineering rule to predicted performance metrics at the network device may involve:

Example 1: predicted delay on path A=0.8 ms, Path A selected.

Example 2: predicted delay on path A=1.3 ms, Path B selected.

The network device 702 at which the traffic engineering engine is implemented may then implement a traffic engineering action (e.g., sending traffic on either Path A or Path B) in response to the traffic engineering decision. For example, SD-WAN software installed on the network device can initiate the transmission of traffic on the selected path. In another example, a traffic engineering rule may dictate the selection of a physical interface of a devices based on some predicted performance metric such as predicted session establishment time. In another example, a traffic engineering rule may dictate a next hop for traffic that is transmitted from the network device based on some predicted performance metric.

FIG. 8 is an example matrix of predicted performance metrics 840 and corresponding traffic engineering policies/rules. In an example, a network device, such as a branch office device, is configured to implement a set of traffic engineering rules, such as the traffic engineering rules described with reference to FIG. 8. For example, a network device is programmed with a set of traffic engineering rules that are implemented locally at the network device on which the traffic engineering rules are stored. In an example, predicted performance metrics that cover an extended period of time in the future, e.g., one hour, one day, one week, and/or one month may be stored at the branch office device for use in making traffic engineering decisions for action that correspond to the periods of time. For example, predicted performance metrics that cover the next seven days may be used by a branch office device over the same next seven days to make traffic engineering decisions.

Figure 9:
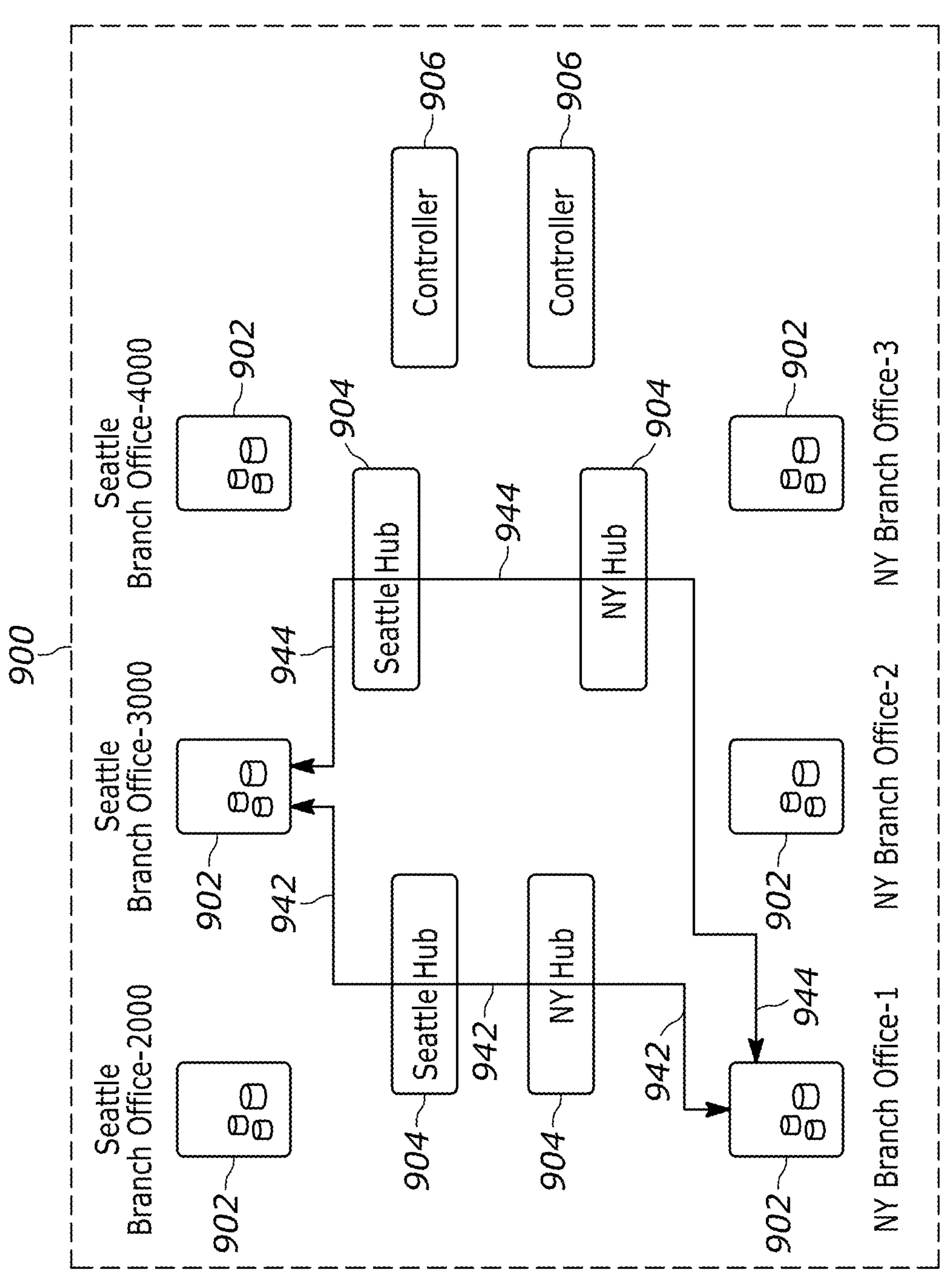
FIG. 9 illustrates an example of implementing a traffic engineering rule that involves selecting a path in an SD-WAN.

FIG. 9 illustrates an example of implementing a traffic engineering rule that involves selecting a path in an SD-WAN 900, such as the SD-WAN 100 (e.g., an overlay network) described with reference to FIG. 1. In the example of FIG. 9, a first branch device 902 (e.g., NY Branch Office-1) can transmit packets to a second branch device 902 (e.g., Seattle Branch Office-3000) via at least two different paths 942 and 944, e.g., where a path corresponds to a transport tunnel between the two branch devices. As illustrated in the example of FIG. 9, the first branch device (e.g., at NY Branch Office-1) can transmit packets to the second branch device (e.g., at Seattle Branch Office-3000) via a first path (Path A, 942), which traverses two hubs 904 (e.g., a NY Hub and a Seattle hub), or via a second path (Path B, 944), which traverses two different hubs (e.g., a different NY Hub and a different Seattle hub). In an example operation, the first branch office (e.g., NY Branch Office-1) will receive predicted performance information from one of the controllers 906 and will generate a device-specific traffic engineering decision in response to applying a traffic engineering rule to the predicted performance metric. As presented above, an example traffic engineering rule that is implemented at the network device may be expressed in pseudocode as:

```
if predicted delay on Path A is greater than 1 ms,
    then select Path B,
    else select Path A.
```

In one example, the first branch office 102 (e.g., NY Branch Office-1) receives predicted performance information that includes a predicted delay on Path A of 0.8 ms. Thus, applying the traffic engineering rule to the predicted performance information at the first branch office (e.g., NY Branch Office-1) results in a decision by the network device of the first branch office to select Path A. In another example, the first branch office (e.g., NY Branch Office-1) receives predicted performance information that includes a predicted delay on Path A of 1.3 ms. Thus, applying the traffic engineering rule to the predicted performance information at the first branch office (e.g., NY Branch Office-1) results in a decision by the network device of the first branch office to select Path B. The first branch office at which the traffic engineering engine decision is made can then implement a traffic engineering action (e.g., sending traffic on either Path A or Path B) in response to the traffic engineering decision. As described above, application of the traffic engineering rule to the predicted performance metric is a relatively simple operation that can be performed with limited computing resources, such as software being executed by a single CPU. Thus, the branch office device doesn't need large-scale computing resources to generate predictions at the device, but can efficiently make decisions regarding traffic engineering based on predicted performance metrics that are received from the controller.

In the example of FIG. 9, the traffic engineering decision involves selecting a path on which to transmit packets. In other examples, the traffic engineering decision relates to other traffic engineering criteria, such as selecting a physical interface from which to send data.

Figure 10A:
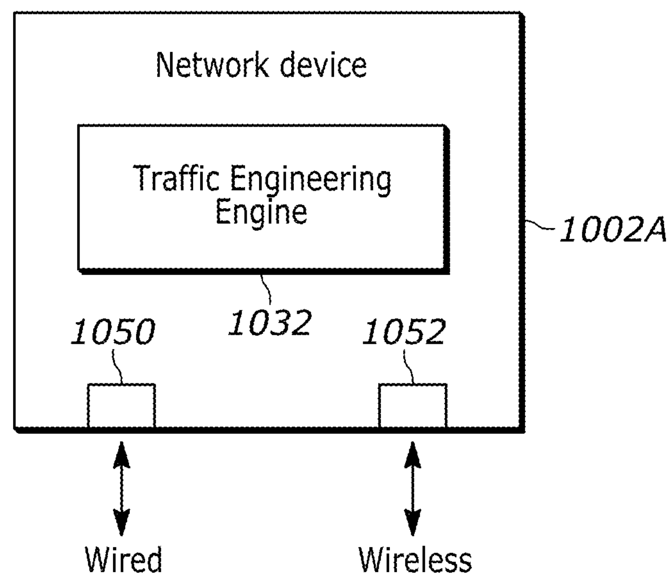
FIG. 10A illustrates an example of a traffic engineering decision that involves selecting an interface for use by a network device in an SD-WAN.

FIG. 10A illustrates an example of a traffic engineering decision that involves selecting an interface for use by a network device 1002A in an SD-WAN. In the example of FIG. 10A, the network device includes a traffic engineering engine 1032 that stores traffic engineering rules as described above, along with two different physical interfaces through which data can be transmitted and received, including a "wired" interface 1050 (e.g., twisted pair wire and/or optical cable) and a "wireless" interface 1052 (e.g., 3G, 4G long term evolution (LTE), satellite). In one example, the network device may be located in an office, such as a branch office in which the network device has an Ethernet connection to a WAN and a mobile service provider connection (e.g., 3G and/or 4G-LTE service) to a WAN. In operation, the traffic engineering engine of the network device receives predicted performance information from a controller of the SD-WAN and makes a traffic engineering decision as described above with reference to FIGS. 7 and 8. For example, the traffic engineering decision is a decision as to what interface (the "wired" or "wireless") should be used by the network device for subsequent data transmissions. In the example of FIG. 10A, the wireless interface is selected and data is transmitted from the wireless interface of the device in response to the selection. As described above, predicted performance information that is received at the network device can be used by the network device to make intelligent traffic engineering decisions.

Figure 10B:
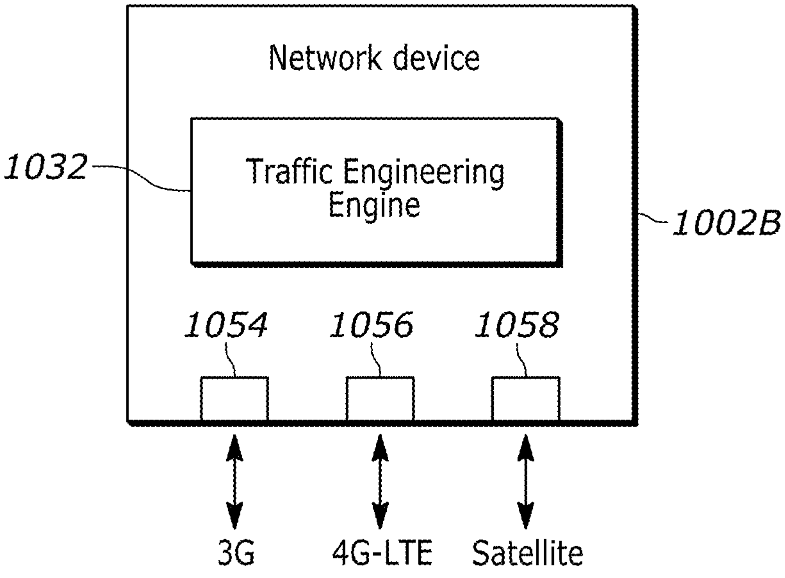
FIG. 10B illustrates another example of a traffic engineering decision that involves selecting an interface for use by a device in an SD-WAN.

FIG. 10B illustrates another example of a traffic engineering decision that involves selecting an interface for use by a network device 1002B in an SD-WAN. In the example of FIG. 10B, the network device includes a traffic engineering engine that stores traffic engineering rules as described above, along with three different physical interfaces through which data can be transmitted and received, including a 3G wireless interface 1054, a 4G-LTE wireless interface 1056, and a satellite wireless interface 1058. In the example, the 3G, 4G-LTE, and satellite wireless interfaces use different technology stacks to wirelessly communicate data as is known in the field of wireless communications. In one example, the network device may be located on a ship that is in water and has no physical network connections (e.g., no twisted pair wires or optical fibers). In operation, the traffic engineering engine of the network device receives predicted performance information from a controller of the SD-WAN on one of the wireless interfaces and makes a traffic engineering decision as described above with reference to FIG. 7. For example, the traffic engineering decision is a decision as to what wireless interface should be used for subsequent data transmissions. In the example of FIG. 10B, the 4G-LTE wireless interface is selected and data is transmitted from the 4G-LTE wireless interface of the device in response to the decision. As described above, predicted performance information that is received at the network device can be used by the network device to make intelligent traffic engineering decisions.

In the examples of FIGS. 10A and 10B, because the predicted performance metrics are pushed out to the network devices 1002A and 1002B in the SD-WAN for local decision making, the network device in the SD-WAN such as the branch office devices described with reference to FIGS. 10A and 10B, can use predicted performance metrics to make quick device-specific traffic engineering decisions without having to receive such decisions from the controller, which may be supporting hundreds, or even thousands of different network devices. Additionally, because the performance metric predictions are made at a centralized component of the SD-WAN like the controller, the network devices that are making traffic engineering decisions do not need the large-scale computing resources that are used to generate the predicted performance metrics.

In an example, the data collector, prediction engine, and messaging engine may be implemented on a single computing device, or the data collector, prediction engine, and messaging engine may be implemented across multiple computing devices. For example, the data collector and the messaging engine may be implemented across multiple geographically distributed computing resources while the prediction engine is implemented by computing resources physically located in the same data center. In addition, although the data collector, prediction engine, and messaging engine are shown as part of the controllers, the data collector, prediction engine, and/or messaging engine may be implemented outside of, or separate from, the controller.

Although the techniques are described herein with regard to an SD-WAN, the techniques are applicable to other network architectures including other overlay networking technologies.

Figure 11:
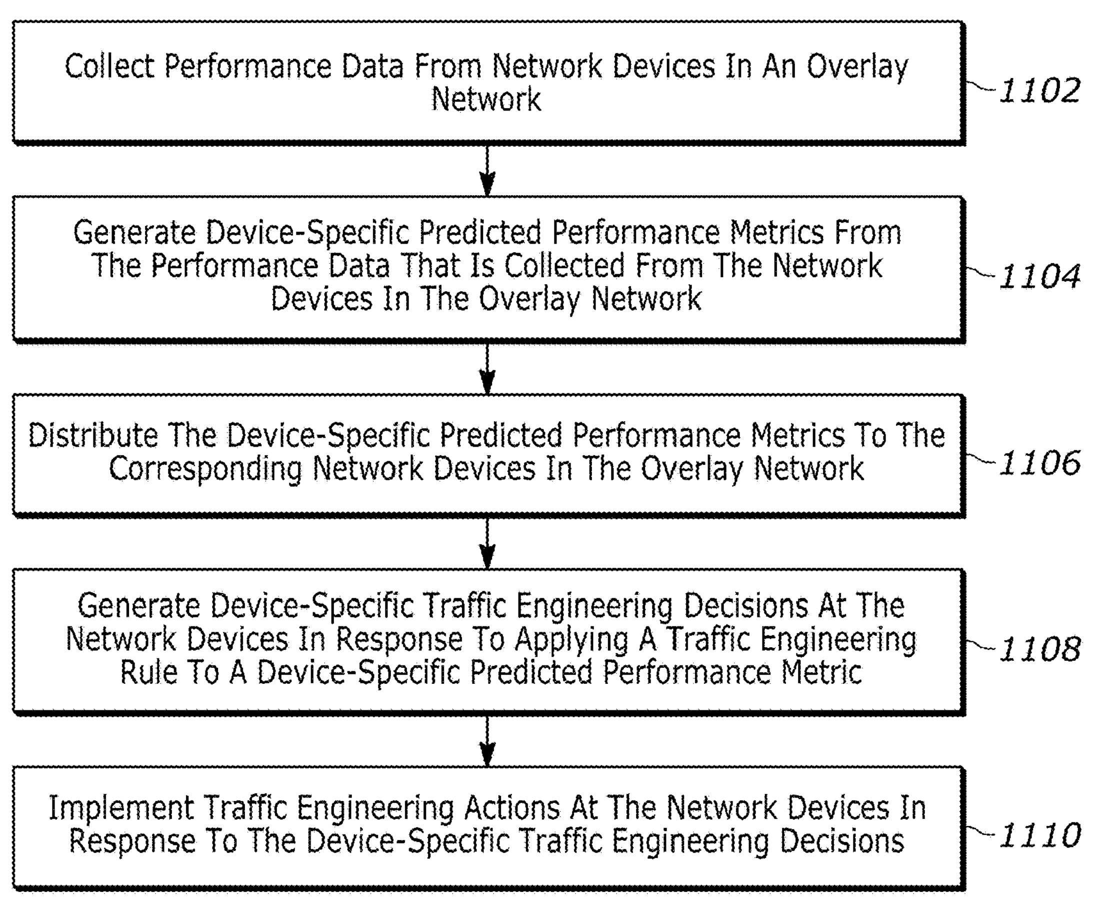
FIG. 11 is a process flow diagram of a method for operating an overlay network such as an SD-WAN.

FIG. 11 is a process flow diagram of a method for operating an overlay network, such as an SD-WAN. At block 1102, performance data is collected from network devices in an overlay network. At block 1104, device-specific predicted performance metrics are generated from the performance data that is collected from the network devices in the overlay network. At block 1106, the device-specific predicted performance metrics are distributed to the corresponding network devices in the overlay network. At block 1108, device-specific traffic engineering decisions are generated at the network devices in response to applying a traffic engineering rule to a device-specific predicted performance metric. At block 1110, traffic engineering actions are implemented at the network devices in response to the device-specific traffic engineering decisions.

Figure 12:
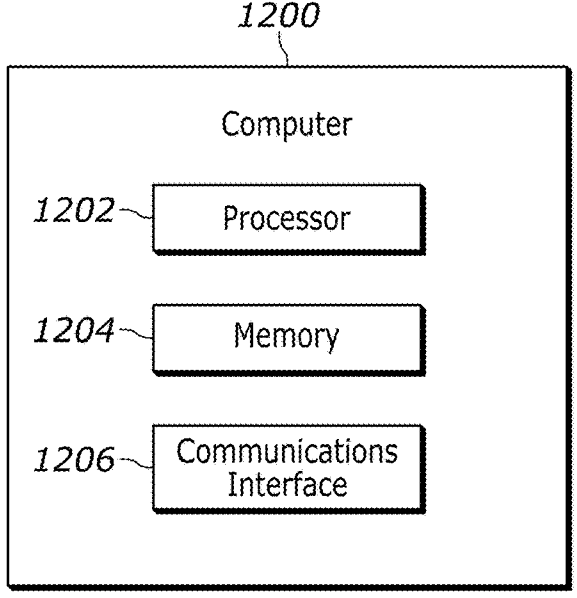
FIG. 12 is a block diagram of a computer that may be used to implement aspect of the techniques disclosed herein.

In an embodiment, the above-described functionality is performed by a computer or computers (e.g., network devices such as routers and/or switches) configured to execute computer readable instructions. FIG. 12 is a block diagram of a computer 1200 that includes a processor 1202, memory 1204, and a communications interface 1206. The processor may include a multifunction processor and/or an application-specific processor. Examples of processors include the PowerPC™ family of processors by International Business Machines Corporation (IBM®) and the x86 family of processors by Intel® such as the Xeon™ family of processors and the Intel® X5650 processor. The memory within the computer may include, for example, storage medium such as read only memory (ROM), flash memory, random access memory (RAM), and a large capacity permanent storage device such as a hard disk drive. The communications interface enables communications with other computers via, for example, the Internet Protocol (IP). The computer executes computer readable instructions stored in the storage medium to implement various tasks as described above. The computer may include additional elements as is known in the field. In an example, the computer may be embodied as a network device, a branch office device, a hub device, a controller device, an appliances, a Cloud Services Gateway (CSG), a network node, or any other computing device that may be configured to interact with the SD-WAN and/or other overlay network. The computer may be a discrete device, such as appliance in an office, or the computer may include multiple computing devices that are interconnected, such as is known with cloud infrastructure, such as is available through public/private cloud infrastructure providers.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a non-transitory computer-readable storage medium for execution by a computer. As an example, an embodiment of a non-transitory computer-readable storage medium includes a computer useable storage medium configured to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for operating an overlay network, the method comprising:

collecting, by a controller of the overlay network, performance data from network devices in the overlay network;

generating, by the controller, device-specific predicted performance metrics from the performance data that is collected from the network devices in the overlay network, wherein each device-specific predicted performance metric is a prediction of a future performance metric for a corresponding network device based on analysis of past performance information;

distributing, by the controller, the device-specific predicted performance metrics to corresponding network devices in the overlay network;

generating, by the corresponding network devices, device-specific traffic engineering decisions in response to applying traffic engineering rules to the corresponding device-specific predicted performance metrics; and implementing, by the corresponding network devices, traffic engineering actions in response to the device-specific traffic engineering decisions.

2. The method of claim 1, wherein the device-specific predicted performance metrics are received on network interfaces of the corresponding network devices.

3. The method of claim 2, wherein the corresponding network devices are network devices in a Software-Defined Wide Area Network (SD-WAN).

4. The method of claim 3, wherein the device-specific predicted performance metrics are received on the network interfaces of the corresponding network devices from the controller, wherein the controller is a controller of the SD-WAN.

5. The method of claim 1, wherein at least one of the device-specific traffic engineering decisions involves selecting a path on which to transmit Protocol Data Units (PDUs), and at least one of the traffic engineering actions involves transmitting PDUs on the selected path.

6. The method of claim 1, wherein at least one of the device-specific traffic engineering decisions involves selecting a physical interface of the corresponding network device on which to transmit Protocol Data Units (PDUs), and at least one of the traffic engineering actions involves transmitting PDUs on the selected physical interface.

7. The method of claim 1, wherein at least one of the device-specific predicted performance metrics is a predicted path performance metric.

8. The method of claim 7, wherein the predicted path performance metric is two-way delay.

9. The method of claim 7, wherein the predicted path performance metric is forward delay variation.

10. The method of claim 7, wherein the predicted path performance metric is reverse delay variation.

11. The method of claim 7, wherein the predicted path performance metric is forward loss ratio.

12. The method of claim 7, wherein the predicted path performance metric is reverse loss ratio.

13. The method of claim 7, wherein the predicted path performance metric is Protocol Data Unit (PDU) loss ratio.

14. The method of claim 7, wherein the predicted path performance metric corresponds to a Service Level Agreement (SLA).

15. The method of claim 1, wherein at least one of the device-specific traffic engineering decisions involves selecting a next-hop on which to transmit Protocol Data Units (PDUs), and at least one of the traffic engineering actions involves directing PDUs to the next-hop.

16. The method of claim 1, wherein at least one of the device-specific predicted performance metrics is a predicted application performance metric.

17. The method of claim 16, wherein the predicted application performance metric is a prediction about a type of application that will be used.

18. The method of claim 16, wherein the predicted application performance metric is a prediction of application latency.

19. The method of claim 16, wherein the predicted application performance metric is a prediction of application loss.

20. The method of claim 1, wherein at least one of the device-specific traffic engineering decisions involves selecting a physical interface on which to transmit data, and at least one of the traffic engineering actions involves transmitting data on the selected physical interface.

21. A non-transitory computer readable medium that stores computer readable instructions, which when executed on one or more processors, implements a method comprising:

collecting, by a controller of an overlay network, performance data from network devices in the overlay network;

generating, by the controller, device-specific predicted performance metrics from the performance data that is collected from the network devices in the overlay network, wherein each device-specific predicted performance metric is a prediction of a future performance metric for a corresponding network device based on analysis of past performance information;

distributing, by the controller, the device-specific predicted performance metrics to corresponding network devices in the overlay network;

generating, by the corresponding network devices, device-specific traffic engineering decisions in response to applying traffic engineering rules to the corresponding device-specific predicted performance metrics; and implementing, by the corresponding network devices, traffic engineering actions in response to the device-specific traffic engineering decisions.

* * * * *